United States Patent [19]

Bruckstein et al.

[11] Patent Number: 5,920,376
[45] Date of Patent: *Jul. 6, 1999

[54] METHOD AND SYSTEM FOR PANORAMIC VIEWING WITH CURVED SURFACE MIRRORS

[75] Inventors: Alfred M. Bruckstein, Summit; Thomas J. Richardson, South Orange, both of N.J.

[73] Assignee: Lucent Technologies, Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/706,156

[22] Filed: Aug. 30, 1996

[51] Int. Cl.⁶ .................................................. G03D 37/00
[52] U.S. Cl. .................................. 352/69; 352/70; 352/71
[58] Field of Search ................................. 352/69, 70, 71

[56] References Cited

U.S. PATENT DOCUMENTS

| | | | |
|---|---|---|---|
| 2,304,434 | 12/1942 | Ayres | 352/69 |
| 3,286,590 | 11/1966 | Brueggemann | 352/69 |
| 3,420,605 | 1/1969 | Kipping | 352/69 |
| 3,506,344 | 4/1970 | Petit, Jr. | 352/69 |
| 3,998,532 | 12/1976 | Dykes | 352/69 |
| 4,078,860 | 3/1978 | Globus et al. | 352/69 |
| 5,539,483 | 7/1996 | Nalwa | 352/69 |

OTHER PUBLICATIONS

"Panoramic Optics Gives U.S. Tankers A Better Than Birdseye View", Rees and Lisic, Industrial Photography, Apr. 1963, pp. 36–69.

"Real–Time Omnidirectional Image Sensor (COPIS) for Vision–Guided Navigation" by Yasushi Yagi, Shinjiro Kawato and Saburo Tsuji. IEEE Transactions On Robotics and Automation, vol. 10, No. 1 Feb. 1994, pp. 11–22.

"Omnidirectional Imaging With Hyperboloidal Projection", by K. Yamazawa, Y. Yagi and M. Yachida. Proceedings of the 1993 IEEE/RSJ International Conference on Intelligent Robots and Systems. Yokohama, Japan. Jul. 26–30–1993. pp. 1029–1034.

*Primary Examiner*—Russell Adams
*Attorney, Agent, or Firm*—Birch, Stewart, Kolasch & Birch, LLP

[57] ABSTRACT

An omnidirectional or panoramic viewer/projector uses a single camera and a mirror with a curved surface. The curved mirror provides a single virtual optical center or viewpoint.

5 Claims, 5 Drawing Sheets

METHOD AND SYSTEM FOR PANORAMIC VIEWING WITH CURVED SURFACE MIRRORS

CROSS-REFERENCE TO RELATED INVENTIONS

This application is related to the following commonly assigned U.S. patent applications: "Panoramic Viewing Apparatus," filed Apr. 28, 1995, Ser. No. 08/431356; "Method And System For Panoramic Viewing," filed Apr. 28, 1995, Ser. No. 08/431354; "High Resolution Viewing System," filed Jun. 6, 1995, Ser. No. 08/497,673; "Panoramic Projection Apparatus," filed Jun. 30, 1995, Ser. No. 08/497,341; "Method and Apparatus For Viewing With A Virtual Optical Center," filed Jul. 27, 1995, Ser. No. 08/508,572; "Shaded Viewing Apparatus," filed Nov. 30, 1995, Ser. No. 08/565,499; and "Spherical Viewing/Projection Apparatus," filed Nov. 30, 1995, Ser. No. 08/565,501.

FIELD OF THE INVENTION

The present invention relates to a viewing system; more particularly, a panoramic viewing system.

DESCRIPTION OF THE RELATED ART

In an effort to operate more efficiently, it is desirable to perform some tasks using telepresence. For example, many businesses now hold meetings using telepresence. Telepresence is also useful for distance learning and remote viewing of events such as concerts and sporting events. A more realistic telepresence is provided to a user by providing the user with the capability to switch between views, and thereby mimic, for example, looking around a meeting room.

In the past, when several views were made available to a user, several cameras with different optical centers were used. Such a situation is illustrated in FIG. 1. FIG. 1 illustrates cameras 2, 4, 6, and 8 with optical centers 10, 12, 14, and 16, respectively. When the user decided to change views, he or she simply switched between cameras. In more sophisticated systems, when a user decided to change views, he or she was able to obtain a view from optical centers 10, 12, 14, or 16 as well as from additional optical centers 18, 20, 22, 24, or 26. Views associated with optical centers such as 18, 20, 22, 24, and 26 were obtained by using views from the two cameras nearest to the selected optical center. For example, a view from optical center 18 was obtained by using the views from cameras 2 and 4 and interpolating between the two views so as to simulate a view from optical center 18. Such procedures introduced irregularities into views. In addition, forming these interpolated views required a large amount of computational power and time, and thereby made this technique expensive and slow to respond to a user's commands. This computational overhead also limited the number of users that can simultaneously use the system.

SUMMARY OF THE INVENTION

One embodiment of the present invention provides an omnidirectional or panoramic viewer/projector using a single camera and a mirror with a curved surface. The curved mirror provides a single virtual optical center or viewpoint.

In another embodiment of the present invention, two parabolic mirrors and a single pinhole or small aperture camera are used to provide an omnidirectional viewer projector.

In yet another embodiment of the present invention, a single hyperbolic mirror surface and a single pinhole or small aperture camera provide an omnidirectional viewer/projector with a single virtual optical center or viewpoint.

BRIEF DESCRIPTION OF THE INVENTION

Figure 1:
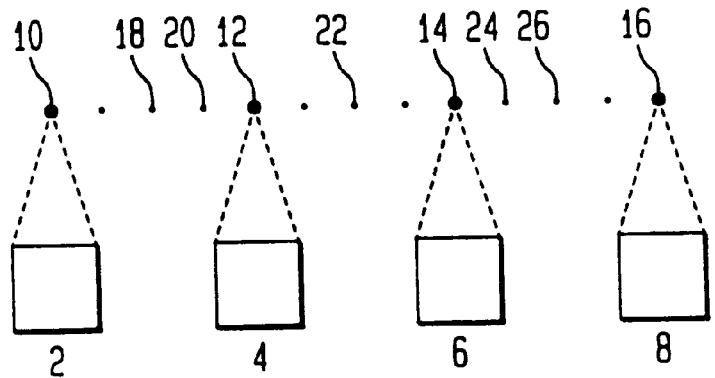
FIG. 1 illustrates a prior art multiple camera viewing system.
Figure 2:
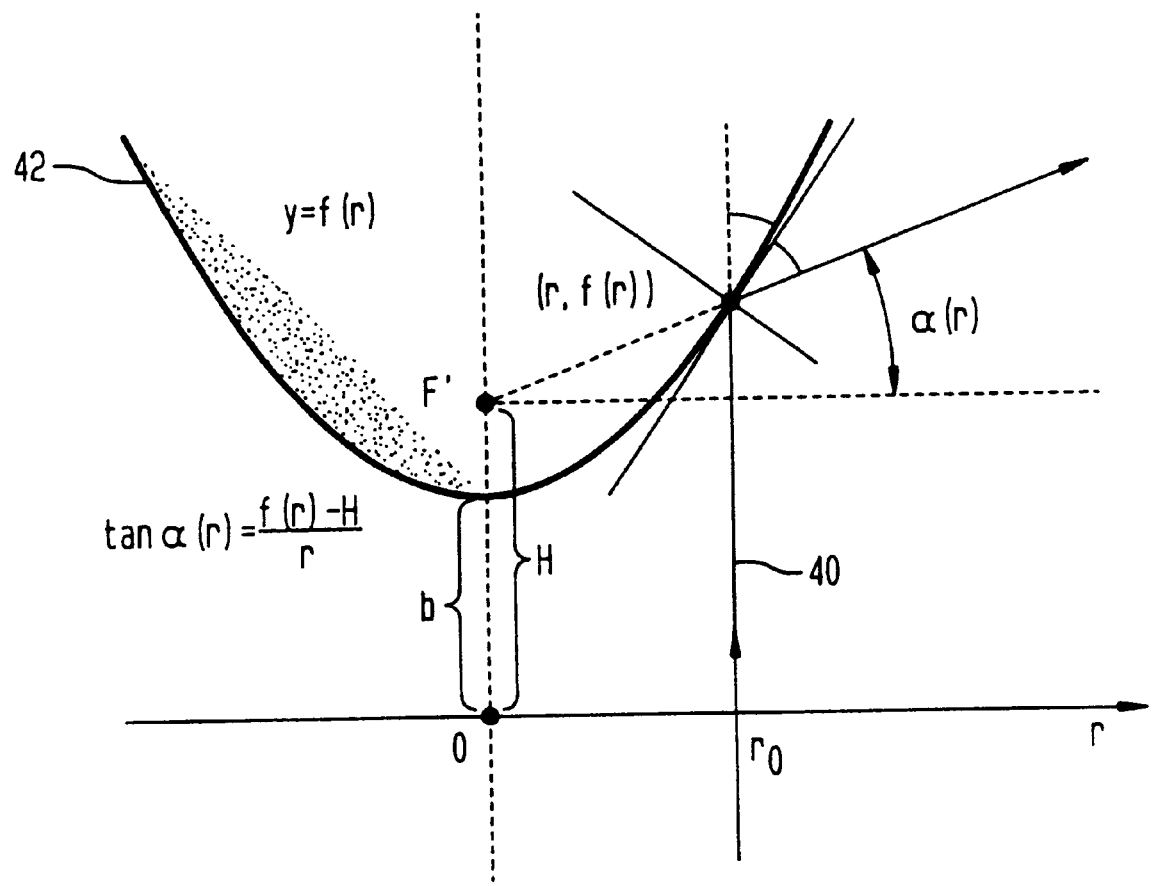
FIG. 2 illustrates parabolic mirror geometry.

We consider first orthographic onmiviewing. In reference to FIG. 2, we see that ray 40 falling on reflective profile 42, $y=f(r)$, vertically from below at $r=r_0$ will be sent into the world as if from a focal point F', (0, H), if the following geometric condition will be satisfied:

$$\frac{((r, f(r) - H), (1, f'(r)))}{\sqrt{r^2 + (f(r) - H)^2}} = ((1, f'(r)), (0, 1))$$

leading to:

$$f'(r) = \frac{r + f'(r)[f(r) - H]}{\sqrt{r^2 + (f(r) - H)^2}} = \frac{d}{dr}(r^2 + (f(r) - H)^2)^{\frac{1}{2}}.$$

Hence $$f(r) = (r^2 + (f(r) - H)^2)^{\frac{1}{2}} + \text{const.}$$

From this we obtain $f(r)=ar^2+b$ is the general solution with $H=\frac{1}{4}a$. Hence, given $f(0)=b$ and $H$ we can determine that the whole profile 42, $f(r)$, is a parabolic profile. Suppose further that, for practical reasons, $r$ is limited to $r_{max}$ and we would like the rays at radius $r_{max}$ to be sent into the world at an angle $\alpha_{max}$. We then have $$\tan\alpha_{max} = \frac{f(r_{max}) - H}{r_{max}} = \frac{ar_{max}^2 - \frac{1}{4a}}{r_{max}},$$

and this yields:

$$a = \frac{\sin\alpha_{max} + 1}{2r_{max}\cos\alpha_{max}}.$$

If $r_{max} = 1$ and $\alpha_{max} = 45°$, we have $a = \frac{1 + \sqrt{2}}{2} = 1.207$.

Figure 3:
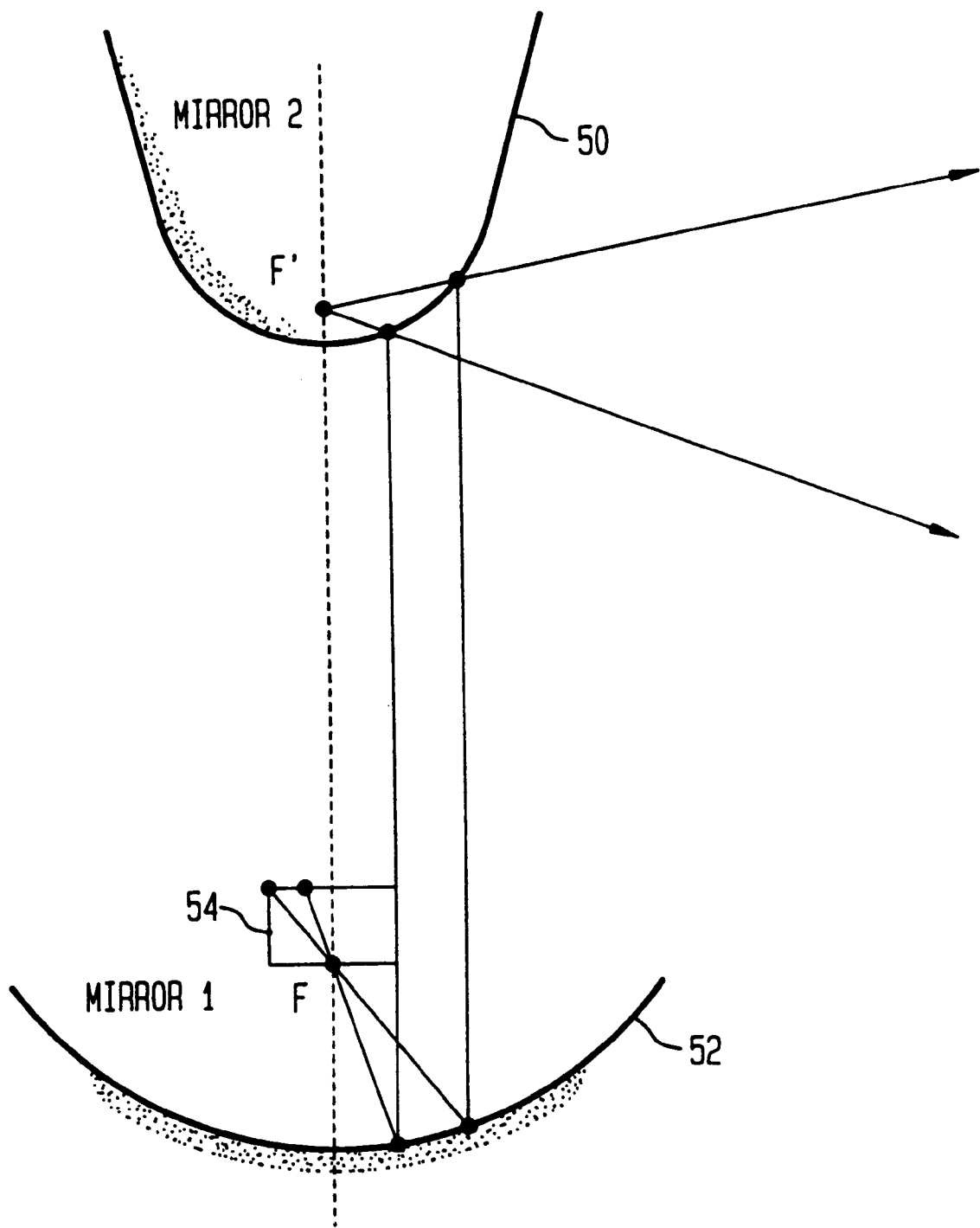
FIG. 3 illustrates an omniviewer or projector with two parabolic mirrors.

In reference to FIG. 3, there are various ways to arrange for orthographic viewing. One could, for example, look at mirror 50 via an array of sensors located at the bottom of the vertical light guiding tubes, similar in structure to the eyes of some insects ("the composite eyes"). It is also possible to use a second parabolic mirror 52, as shown in FIG. 3. Pinhole camera 54 looks down into parabolic mirror 52, with the pinhole located at the focus F. This is equivalent to having an orthographic projection view of parabolic mirror 42 located in FIG. 2. The two-mirror arrangement shown in FIG. 3 achieves omniviewing via the use of a pinhole camera.

Another embodiment of the invention calls for the determination of a mirror profile that reflects the rays from a pinhole camera looking up, as if those would all originate without reflection from a common viewpoint F', on the mirror's symmetry axis. In reference to FIG. 4 and as discussed above, we are looking for a mirror profile 60, y=f(r), for which (see FIG. 4) the reflected ray 62 (F'P) and the incident ray 64 (FP) form identical angles with the tangent to profile 60 at P=(r,f(r)). Letting F'=(0, 1) and F=(0, −1), this condition is equivalent to $$\frac{((r, f(r)+1), (1, f'(r)))}{\sqrt{r^2 + (f(r)+1)^2}} = \frac{((r, f(r)-1), (1, f'(r)))}{\sqrt{r^2 + (f(r)-1)^2}},$$

leading to:

$$\frac{r + (f(r)+1)f'(r)}{\sqrt{r^2 + (f(r)+1)^2}} = \frac{r + (f(r)-1)f'(r)}{\sqrt{r^2 + (f(r)-1)^2}} \qquad (3.1)$$

or $$\frac{d}{dr}|FP| = \frac{d}{dr}|F'P|.$$

From this we see that the curve y=f(r) is the locus of points whose difference of distances to F and F' is constant. This locus is well known to be a hyperbola. More precisely, the solution to the differential equation (3.1) takes the form $$f(r) = \sqrt{\frac{b}{1-b}r^2 + b}.$$

Figure 4:
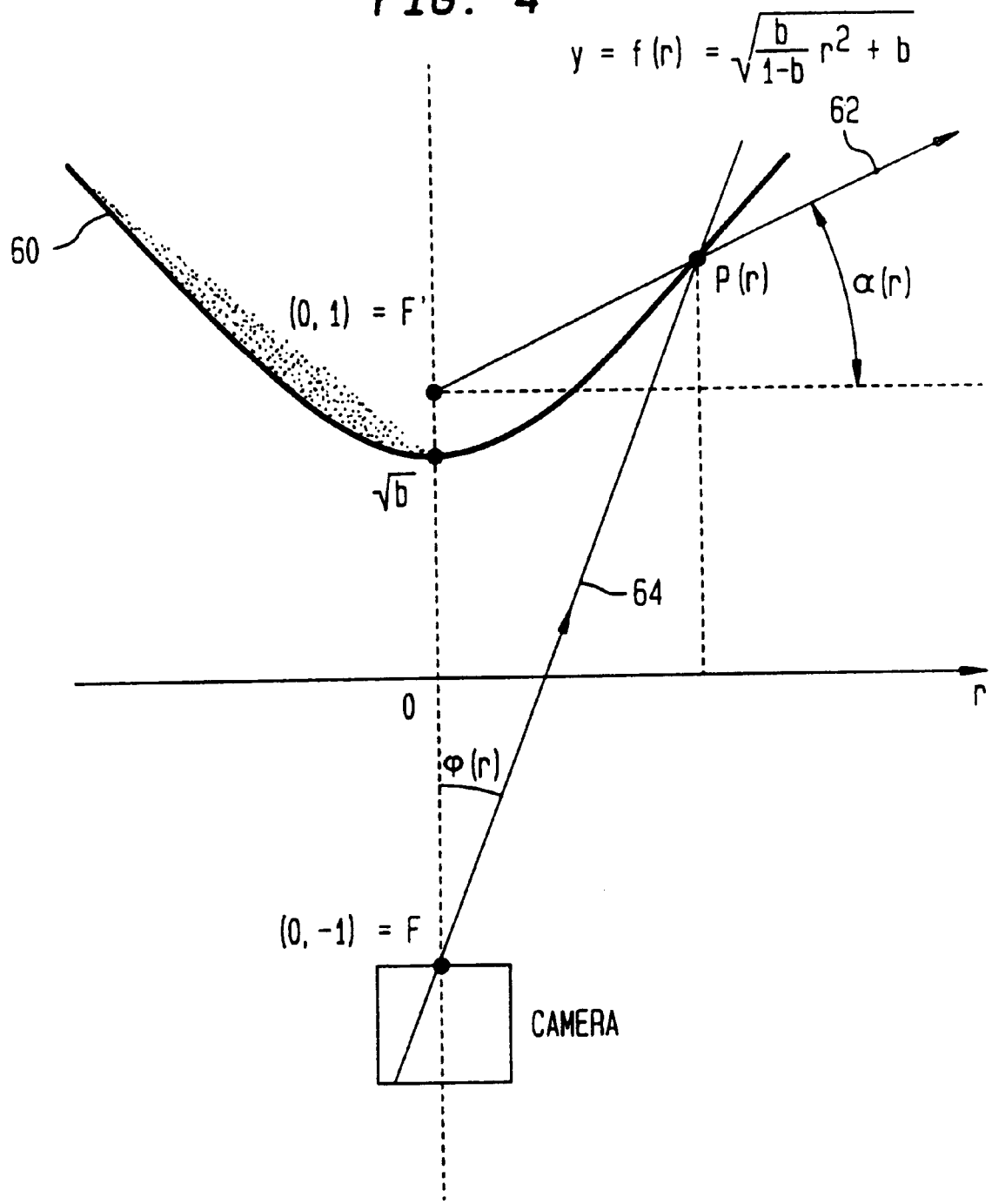
FIG. 4 illustrates hyperbolic mirror geometry.

The parameter b=f²(0) is a design parameter that should be set to achieve desired performance in terms of the spatial coverage of the mirror. To facilitate this we should express b in terms of r and α, or in terms of α and φ. Referring to FIG. 4, we have $$|FP|=|F'P|+2\sqrt{b} \qquad (3.2)$$

$$|FP|\sin\phi=|F'P|\cos\alpha=r \qquad (3.3)$$

$$|FP|\cos\phi=|F'P|\sin\alpha=2. \qquad (3.4)$$

Squaring both sides of (3.3) and (3.4) and adding we obtain $$|FP|^2=|F'P|^2+4|F'P|\sin\alpha+4.$$

If we now substitute for |FP| using (3.2) then we have $$4\sqrt{b}|F'P| + 4b = 4|F'P|\sin\alpha + 4. \qquad (3.5)$$

If we now substitute |F'P|=r/cosα (from (3.3)), then we obtain a quadratic equation in √b which can be solved to obtain $$\sqrt{b} = \frac{-r + \sqrt{2 + r^2 + 2\cos(2\alpha) + 2r\sin(2\alpha)}}{2\cos\alpha} \qquad (3.6)$$

Alternatively, we can solve (3.3) and (3.4) to obtain |FP| and |F'P| in terms of φ and α and then substitute the result into (3.2) to obtain $$\sqrt{b} = \frac{\cos\alpha - \sin\phi}{\cos(\alpha + \phi)}. \qquad (3.7)$$

Figure 5:
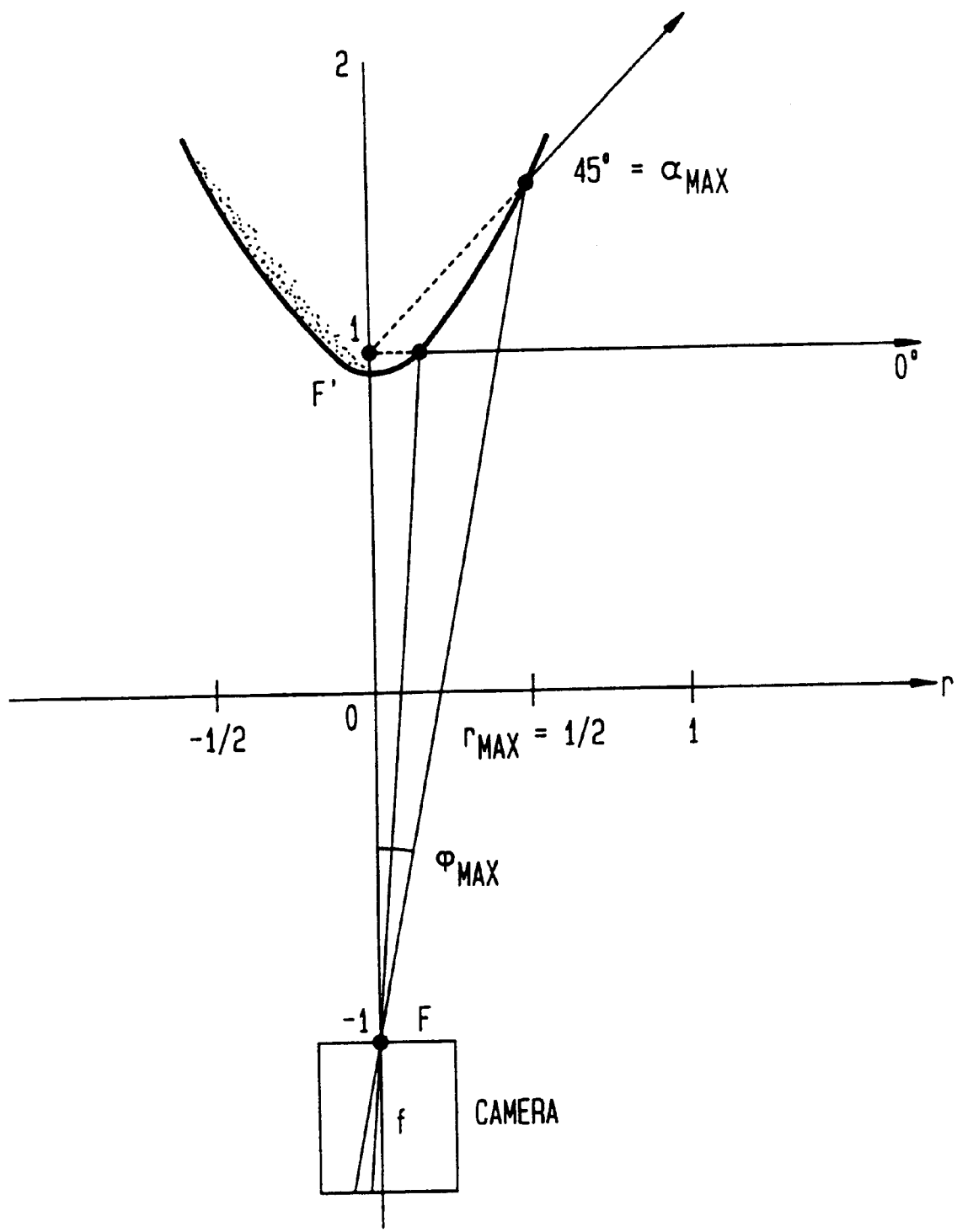
FIG. 5 illustrates an omniviewer or projector with a hyperbolic mirror.

Suppose that for r=$r_{max}$ we wish to have a reflected (outgoing) ray at α($r_{max}$)=$\alpha_{max}$. We then apply equation (3.6) to obtain the required b. For example, setting $\alpha_{max}$=45° and $r_{max}$=½ yields b=0.84861218. This design is shown in FIG. 5.

From equation (3.5) we obtain $$|F'P| = \frac{1-b}{\sqrt{b} - \sin\alpha}.$$

Dividing (3.4) through by (3.2) and substituting for |F'P| from the above, we now obtain $$\cos\phi = \frac{2\sqrt{b} - (1+b)\sin\alpha}{(1+b) - 2\sqrt{b}\sin\alpha}$$

which can be used to determine the spacing in φ in order to sample the world over rings with equal spacing in α. This, as will be seen below, is a consideration in the design of cameras and senor arrays for omniviewing.

A camera with a very small aperture taking images on a photographic film may be used. However, if we wish to do omniviewing with a camera having a high resolution CCD or other type of sensor array, the following should be considered.

Figure 6:
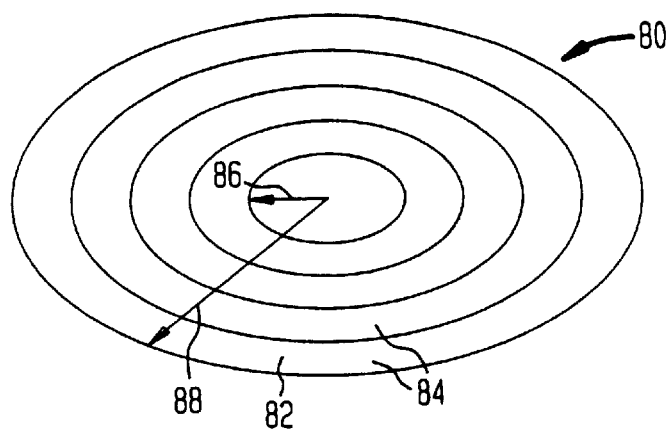
FIG. 6 illustrates a camera sensor array.

Under idealized conditions, the omniviewers proposed will produce an image I(θ, r), that will have to be mapped into a cylindrical image $I^p$ (x, y) via say:

$$I^p (x, y)=I(x=\theta, y=\lambda(r)),$$

where λ(r) would be chosen so that y is linear in α. This mapping is quite problematic because we can readily see that the image resolution varies with r. Fortunately, of the image I(θ,r) produced by the camera we have to consider only an annular domain between $r_{LOW}$ and $r_{HIGH}$ only. Even this being the case, significant problems of resampling and interpolation necessarily arise if I(θ,r) is acquired with a square sensor array. In reference to FIG. 6, it is preferable to use a camera having a sensor array 80 with sensor cells 82 arranged in sets of concentric rings 84 covering the area of interest only (i.e., the annular region between $r_{LOW}$ 86 and $r_{HIGH}$ 88). The formulae developed in the preceding section relating the angle φ to the angle α of the rays looking into the world enable us to design the spacing of rings for the sensor array so as to correspond to a desired policy of sampling the world uniformly in the vertical direction. (For every α we shall sample the world over a ring of rays corresponding to all θ∈[0, 2π].)

Suppose that we want to sample the world from some $\alpha_{min}$ to $\alpha_{max}$ in equal spacings of $$\Delta \alpha = \frac{\alpha_{min} - \alpha_{max}}{M}.$$

Then the rings in the sensor should correspond to the angles Φ; given by $$\phi_i = \arccos\left[\frac{2\sqrt{b} - (1+b)\sin(\alpha_{min} + i\Delta\alpha)}{(1+b) - 2\sqrt{b}\sin(\alpha_{min} + i\Delta\alpha)}\right]$$

and their space locations will be determined by $$r_i = f \cdot \tan\Phi_i \cdot (f = \text{focal length}).$$

Hence, when designing a camera and sensor we have the formulae for the complete design of the circular sensor array in terms of the mirror design (b), the spatial coverages ($\alpha_{max}$, $\alpha_{min}$) and sample rate (M) and the focal length (f) of the camera. We should aim for high resolution both radially (θ) and vertically (M).

It should be noted that the viewer may be used as a projector by replacing the camera with a projector.

Figure 7:
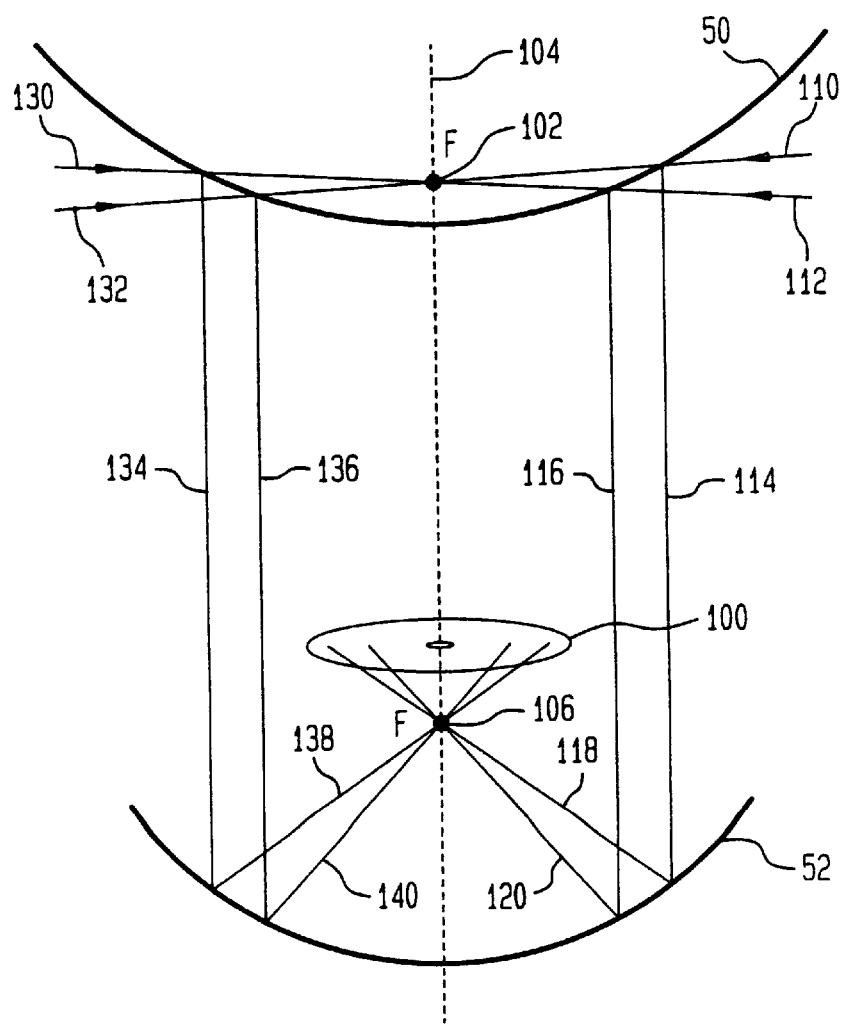
FIG. 7 illustrates images directed to an image plane.

FIG. 7 illustrates the camera image plane 100 and how rays composing images are directed to image plane 100. Image plane 100 may be, for example, within camera 54 of FIG. 3. Parabolic mirror 50 has focal point 102 and is symmetric about axis 104. Focal point 102 is the focus of the parabolic profile of mirror 50. In addition, focal point 102 forms a virtual focal point for the omnidirectional viewer. An image reflected by parabolic mirror 50 is received by parabolic mirror 52. The inner surface of parabolic mirror 52 reflects the image to image plane 100. Parabolic mirror 52 is formed on a parabolic profile having a focal point 106. The camera associated with image plane 100 also has a focal point at focal point 106. Focal point 106 is also on axis 104 which is an axis of symmetry for parabolic mirror 52. Incident rays 110 and 112 from an image are reflected by the outer surface of mirror 50. The reflected rays 114 and 116 are reflected by the inner surface of parabolic mirror 52. Parabolic mirror 52 reflects rays 114 and 116 to form rays 118 and 120 which form an image on image plane 100. Likewise, incident rays 130 and 132 are reflected by the outer surface of parabolic mirror 50 to form reflected rays 134 and 136. Rays 134 and 136 are reflected by the inner surface of parabolic mirror 52 to form rays 138 and 140. Rays 138 and 140 are then received on image plane 100 to capture an image. It can be seen from the figure that the images reflected by the parabolic mirrors form annular regions on image plane 100. It can also be seen from the figure that focal point 102 forms a virtual optical center for the viewing system. To a person using the viewing system, it would be as if the person were sitting at point 102 and viewing the surrounding area.

We claim:

1. A viewing system, comprising:

a first parabolic profile with an outer reflective surface, the first parabolic profile having a first focal point located within the first parabolic profile and on a symmetry axis about which the first parabolic profile is symmetric;

a second parabolic profile with an inner reflective surface, the second parabolic profile having a second focal point located within the second parabolic profile and on the symmetry axis, the second parabolic profile being symmetric about the symmetry axis; and a light gathering device positioned to gather light passing through the second focal point, said light gathering device being located between said first parabolic profile and said second focal point.

2. The viewing system of claim 1, wherein the light gathering device is a camera.

3. The viewing system of claim 2, wherein the camera comprises a sensor array having a plurality of sensor cells, the plurality of sensor cells arranged in respective sets, said sets being arranged in respective concentric rings.

4. A viewing system, comprising:

a hyperbolic profile with an outer reflective surface, the hyperbolic profile having a first focal point located within the hyperbolic profile and on a symmetry axis about which the hyperbolic profile is symmetric; and a camera positioned to gather light passing through a second focal point located on the symmetry axis, the second focal point being a point on the symmetry axis crossed by a reflected ray produced by an incident ray being reflected by the outer reflective surface, the incident ray being collinear with a line passing through the first focal point and the point at which the incident ray contacts the outer reflective surface and the camera having a plurality of sensors arranged in respective sets, said sets being arranged in respective concentric rings.

5. A projection system, comprising:

a first parabolic profile with an outer reflective surface, the first parabolic profile having a first focal point located within the first parabolic profile and on a symmetry axis about which the first parabolic profile is symmetric;

a second parabolic profile with an inner reflective surface, the second parabolic profile having a second focal point located within the second parabolic profile and on the symmetry axis, the second parabolic profile being symmetric about the symmetry axis; and a projection device positioned to produce light passing through the second focal point, said projection device being located between said first parabolic profile and said second focal point.

* * * * *